United States Patent [19]
Yoldas

[11] 4,286,024
[45] Aug. 25, 1981

[54] TRANSPARENT HIGH TEMPERATURE RESISTANT ALUMINUM SILICON OXIDE MONOLITHIC MEMBER OR COATING

[75] Inventor: Bulent E. Yoldas, Churchill, Pa.

[73] Assignee: Westinghouse Electric Corp., Pittsburgh, Pa.

[21] Appl. No.: 144,749

[22] Filed: Apr. 28, 1980

[51] Int. Cl.³ .................. C04B 39/12; C04B 35/10; C04B 35/14
[52] U.S. Cl. .................................. 428/446; 106/65; 427/164; 427/380; 428/702
[58] Field of Search .................. 106/65; 428/539; 427/164, 380

[56] References Cited

U.S. PATENT DOCUMENTS 3,826,813  7/1974  Gardner et al. .............. 106/65 X
3,941,719  3/1976  Yoldas ............................ 252/463

OTHER PUBLICATIONS

Yoldas, "A Transparent Porous Alumina," *American Ceramic Society Bulletin*, vol. 54, No. 3, Mar. 1975, pp. 286–288.
Yoldas, "Thermal Stabilization of an Active Alumina and Effect of Dopants on the Surface Area," *Journal of Materials Science*, vol. 11, (1976), pp. 465–470.
Yoldas, "Alumina Sol Preparation from Alkoxides," *American Ceramic Society Bulletin*, vol. 54, No. 3, Mar. 1975, pp. 289–290.
Yoldas, "Preparation of Glasses and Ceramics from Metal Organic Compounds," *Journal of Materials Science*, vol. 12, (1977), pp. 1203–1208.

*Primary Examiner*—James R. Hoffman
*Attorney, Agent, or Firm*—W. D. Palmer

[57] ABSTRACT

High-temperature-resistant transparent monolithic member or coating on a substrate consisting of aluminum and silicon in an atom ratio of about 2:1 and in reacted oxide form. The member or coating is formed by reacting precursor alkoxides of aluminum and silicon in the presence of water or reacting precursors derived from these alkoxides, gelling the reacted precursors, and drying the gel in the form of a monolithic member or coating. The dried member is then heated to evolve all residual hydrogen and carbon and residual water and to eliminate porosity to form the monolithic member or coating.

7 Claims, 2 Drawing Figures

TRANSPARENT HIGH TEMPERATURE RESISTANT ALUMINUM SILICON OXIDE MONOLITHIC MEMBER OR COATING

CROSS-REFERENCE TO COPENDING APPLICATIONS

In copending application Ser. No. 065,706, filed Aug. 10, 1979, by Bulent E. Yoldas, the present applicant, and owned by the present assignee, is disclosed a method for forming anti-reflective films wherein specific relative amounts of metallic alkoxides are reacted to produce partially hydrolyzed and polymerized clear solutions. These clear solutions are applied to a predetermined thickness onto a substrate to be coated, such as a surface of a silicon wafer as used in a solar cell. After the coating material is applied, it is heat treated and the resulting coated wafer has substantially decreased reflectivity for the energizing radiations for the solar cell. To deposit a titania-silica, anti-reflective coating, separate clear solutions of partially hydrolyzed titanium alkoxides and silicon alkoxides are first separately prepared and then mixed, and thereafter the mixture is deposited onto the substrate to be coated.

In copending application Ser. No. 084,217, filed Oct. 12, 1979 by Bulent E. Yoldas, the present applicant, and owned by the present assignee, is disclosed a method for forming a heat mirror for an incandescent lamp envelope wherein a titania coating of predetermined thickness is first formed on the envelope interior surface by depositing thereon to a predetermined thickness a clear solution of partially hydrolyzed titanium alkoxide. The envelope and applied solution are then heated to a limited temperature to convert the solution to a continuous titanium oxide layer. The heat mirror processing is then completed by applying over the titanium oxide film additional selected material.

BACKGROUND OF THE INVENTION

This invention relates to transparent, high-temperature-resistant, aluminum-silicon-oxide monolithic members or coatings and, more particularly, to such members or coatings which are prepared by reacting precursors, derived from alkoxides and gelling the reacted precursors, with the gel dried in the desired configuration, and then heated to eliminate porosity.

Silica and alumina are important constituents of many of the technological products of the ceramic and glass industry. Silica is processed in vitreous form and has widespread industrial application because of its refractory nature, chemical stability, and low thermal expansion. One weakness of vitreous silica is that prolonged use above 1000° C. normally caused it to transform into cristobalite, resulting in a large dimensional change which destroys the mechanical integrity of the material upon thermal cycling.

Alumina has many technical and industrial uses and occurs in a number of forms. Alumina is industrially produced in transparent form as single crystal sapphire and in sintered polycrystalline form and is extensively used as arc tubes for high-pressure sodium lamps.

Mullite ($3Al_2O_3.2SiO_2$) is an important refractory material which is formed in the alumina-silica binary. Most of the studies of the alumina-silica binary system have involved preparation of materials by high-temperature reactions. Since both silica and alumina are relative refractory oxides, crystalline transformations take place in either oxide before substantial reaction or diffusion takes between the oxides.

In *The American Ceramic Society Bulletin,* Volume 54, No. 3, March, 1975, pages 286–288, article by B. E. Yoldas, is reported an active alumina which can be produced in transparent bulk form at temperatures as low as 500° C. This alumina has extremely small pores which do not interact with light. Thus the material remains transparent up to 1200° C., where it nondestructively converts to alpha-alumina and loses its transparency.

In *Journal of Materials Science* 11 (1976), pages 465–470, article by B. E. Yoldas, is reported the stabilization of active alumina through incorporation of 6% by weight silica into the structure, which increases the alpha-alumina transformation temperature from 1200° to about 1380° C.

The preparation of alumina sols from aluminum alkoxides is disclosed in *American Ceramic Society Bulletin,* Volume 54, No. 3, pages 298–290, March, 1975, article by B. E. Yoldas, and a patent corresponding to this is U.S. Pat. No. 3,941,719 dated Mar. 2, 1976.

The preparation of glasses and ceramics from metalorganic compounds is disclosed in *Journal of Materials Science* 12 (1977), pages 1203–1208, article by B. E. Yoldas. The reaction of ethoxysilanol with aluminum alkoxide is disclosed at page 1206 of this article. This includes forming a gel from the reacted alkoxides, drying and then firing the dried material. Such a technique can be used to form a monolithic ceramic member.

SUMMARY OF THE INVENTION

There is provided a high-temperature-resistant, transparent, monolithic member, or coating on a substrate, consisting of aluminum and silicon in an atom ratio of about 2:1 in reacted oxide form. The member or coating is formed by reacting precursor alkoxides of aluminum and silicon in the presence of water to form a clear solution, gelling the reacted precursors and drying the gel in the form of a monolithic member or a coating. The dried member or coating is then heated at a predetermined temperature and time sufficient to evolve all residual hydrogen and carbon and residual water and to eliminate porosity, in order to form the monolithic member or coating.

BRIEF DESCRIPTION OF THE DRAWING

For a better understanding of the invention, reference may be had to the preferred embodiments, exemplary of the invention, in which.

DESCRIPTION OF THE PREFERRED EMBODIMENTS

Figure 1:
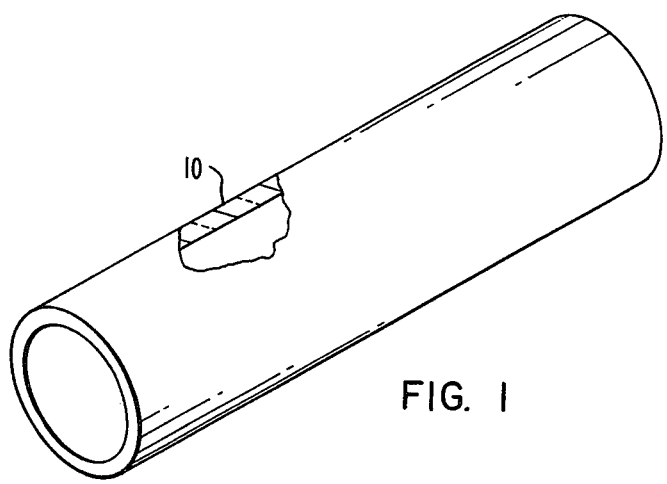
FIG. 1 is an isometric view, shown partly in section, of a transparent, alumina-silica monolithic member which is formed as a tube.

The present reacted composition in the alumina-silica binary, when prepared by the polymerization technique described herein, retains its transparency at elevated temperatures, whereas other compositions in this binary rapidly lose their transparency.

To form the present monolithic members, at least one of aluminum alkoxide or sodium alkoxide is partially hydrolyzed and a hydrolyzed precursor alkoxide is reacted with the other precursor alkoxide, with the atom ratio of aluminum to silicon in the reacted material being that which is desired in the member to be formed. The hydrolyzation and bond formation between Si and Al is represented by the following reactions:

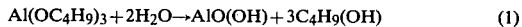

$$Al(OC_4H_9)_3 + 2H_2O \rightarrow AlO(OH) + 3C_4H_9(OH) \quad (1)$$

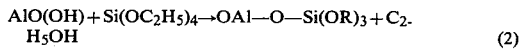

$$AlO(OH) + Si(OC_2H_5)_4 \rightarrow OAl-O-Si(OR)_3 + C_2H_5OH \quad (2)$$

or

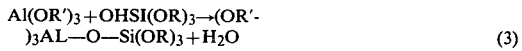

$$Al(OR')_3 + OHSI(OR)_3 \rightarrow (OR')_3AL-O-Si(OR)_3 + H_2O \quad (3)$$

The foregoing formulations consider silicon tetraethoxide and aluminum sec-butoxide. Other aluminum and silicon alkoxides can be substituted therefor, but these specified alkoxides will be considered throughout the examples. As seen from the foregoing equations (2) and (3), either unhydrolyzed tetraethylsilicate or partially hydrolyzed ethyloxysilanol can react with the other precursor to form a chemical bond with silicon and aluminum through oxygen, as in the case of oxide network formation, i.e., $\equiv Si-O-Al\equiv$. The alumina-siloxane derivative remains soluble until further reaction takes place by either water additions or aging, resulting in substantial polymerization between silicon and aluminum through oxygen. These reactions progressively exclude organic groups, (OR), and hydroxyl from the network, thus eventually yielding a substantially organic-free oxide network with the material being a stiff, clear gel. To form a monolithic member, the gel is then formed into the configuration desired for the monolithic member, the conformed gel is dried and then heated to a temperature in the order 1200° C. to 1400° C. for a period of two to four minutes, for example, which causes liberation of the residual hydroxides and organic groups and substantially eliminates porosity to form the monolithic member.

As a specific example, an aluminum precursor sol is prepared by hydrolysis of aluminum sec-butoxide, and peptization of a resultant monohydroxide with 0.07 mol nitric acid per mol of alkoxide. The details for preparing such an alumina sol are set forth in the aforementioned *American Ceramic Society Bulletin*, Volume 54, No. 3, March 1975, pages 289-290. The acid which is utilized to peptize the sol is at least one of nitric, hydrochloric, perchloric, acetic, trichloroacetic, and formic, all of which will produce clear peptized sols. As a specific example, one mol of aluminum sec-butoxide is hydrolyzed in 100 mols water at a temperature of 75° C., then 0.07 mol of the indicated acid such as nitric is added, and the material is then maintained at a temperature of 95° C. This produces the clear peptized sol of AlO(OH).

Silicon tetraethoxide and ethyl alcohol are then slowly added to the prepared alumina sol with the ratio of total atoms of aluminum in the sol to total atoms of silicon in the added silicon alkoxide being about 2:1. The alumina-siloxane mixture may remain liquid until further reaction or concentration takes place, either by aging or evaporation by boiling, resulting in polymerized gel formation. As a detailed example, one mole (246 g) aluminum sec-butoxide is hydrolyzed with 2000 ml water at 70° C. under vigorous stirring. The slurry is stirred for 10-15 minutes and the temperature increased to 80° C. 5.4 g of conc. nitric acid is then added to the slurry and the resultant mixture is then maintained at 80°-100° C. until it is peptized to a clear liquid. The solution is then boiled down to about 500 cc to provide an equivalent $Al_2O_3$ concentration of about 10% by weight. After cooling, 104 g of $Si(OC_2H_5)_4$ is added. The immiscibility of these two solutions is overcome by adding ethyl alcohol until the mixture becomes clear. The resulting system normally gels in less than two hours, although the gelling time will depend on the concentration of the solutions and the degree of hydrolysis of the alkoxides prior to mixing.

The gel is then formed into the general configuration desired for the monolithic member. As a specific example, to provide a member in the form a tube, such as might be used for an envelope for a discharge device, the gel can be extruded into the form of a tube. The gel is then dried at room temperature, and then heated to a temperature in the range of about 1200° C. to about 1400° C. for a period of two to four minutes which liberates any residual hydroxides and organic groups as well as substantially eliminating all porosity, with the resultant formation of the monolithic member. The heating time will vary depending upon the size of the member, with the lower the temperature, the longer the time. A tubular member 10 which has been formed by the foregoing process is shown in FIG. 1. This member has utility as an envelope for a discharge device.

The preferred aluminum oxide to silicon oxide weight ratio in the prepared monolithic member is 63%-37%. This ratio can be varied to provide a weight ratio of aluminum oxide to silicon oxide of from 68:32 to 47:43. Within the indicated ratio, and especially at the optimized weight ratio of 63:37, the monolithic member retains its transparency even at temperatures of 1400° C. At aluminum oxide-silicon oxide concentrations outside the specified range, the material loses its transparency when heated to this temperature.

X-ray diffraction studies of the 63%-37% material indicate that the transparency is not directly related to any particular crystal structure or phase transformation since all samples are crystalline. After being heated to a temperature of 1400° C., the transparent monolithic member is 87% mullite and 3% cristobalite, although it is still transparent.

As indicated hereinbefore, other aluminum and silicon alkoxide precursors may be substituted for those used in the examples. As a general rule, the alkyl portion of such other alkoxides will have from 1 to 6 carbon atoms.

Figure 2:
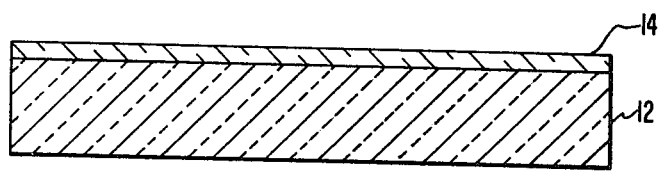
FIG. 2 is a sectional view elevation of a quartz substrate which is provided with a thin alumina-silica coating formed in accordance with the present invention.

The present high-temperature-resistant, transparent aluminum oxide-silicon oxide material can also be used as a coating serving to protect a refractory substrate, such as quartz, for example. Such an embodiment is shown in section in FIG. 2 wherein the quartz substrate 12 has applied thereover a thin coating 14 of the present material, coated to a thickness of one micron or less, for example. Since nucleation of quartz at high temperatures normally starts at the surface portion thereof, the present material will provide some degree of protection for the quartz. To apply the coating, a very thin layer of the reacted alkoxides is applied to the substrate to be coated. Such a thin layer gels in rapid fashion and it is then dried and heated as indicated hereinbefore. If desired, both surfaces of the quartz member 12 can be coated.

What I claim is:

1. A high-temperature-resistant transparent monolithic member or coating on a substrate, said member or coating consisting of aluminum and silicon in an atom ratio of about 2:1 in reacted oxide form, said member or coating having been formed by reacting precursor alkoxides of aluminum and silicon in the presence of water to form a clear solution, gelling the reacted precursors, drying the gel in the form of a monolithic member or a coating, and heating the dried material at a predetermined temperature and time sufficient to evolve all residual hydrogen and carbon and residual water and to substantially eliminate porosity to form said monolithic member or coating on a substrate.

2. A high-temperature-resistant transparent monolithic member consisting of aluminum and silicon in an atom ratio of about 2:1 in reacted oxide form; said member having been formed by partially hydrolyzing at least one one of precursor aluminum alkoxide and precursor silicon alkoxide, and reacting the precursors to form a clear solution, with the atom ratio of aluminum to silicon in the reacted material being that which is desired in the member to be formed; gelling the reacted precursors; forming the gel into the configuration desired, drying the conformed gel; and heating the dried member at a predetermined temperature and time sufficient to evolve all hydrogen and carbon and residual water and to substantially eliminate porosity to form said monolithic member.

3. A high-temperature-resistant transparent monolithic member consisting of aluminum and silicon in an atom ratio of about 2:1 in reacted oxide form; said member having been formed by preparing an aluminum precursor sol by hydrolyzing aluminum alkoxide to form aluminum monohydroxide, and peptizing the resultant monohydroxide by acidifying the prepared sol by addition of a small predetermined amount of selected acid; mixing predetermined amounts of unhydrolyzed or partially hydrolyzed silicon alkoxide and reacting said aluminum monohydroxide and said silicon alkoxide to form a clear solution, with the ratio of total atoms of aluminum in said peptized sol to total atoms of silicon in said mixed silicon alkoxide being about 2:1, gelling the reacted precursors; forming the gel into a predetermined configuration and drying same; and heating the dried member at a predetermined temperature and time sufficient to evolve all residual hydrogen and carbon and residual water and substantially eliminate porosity to form said monolithic member.

4. The member as specified in claim 3, wherein said aluminum alkoxide which is hydrolyzed to aluminum monohydroxide is aluminum sec-butoxide; said selected acid used to peptize said prepared sol is at least one of nitric, hydrochloric, perchloric, acetic, trichloroacetic and formic; and said silicon alkoxide which is added to said peptized sol is silicon tetrathoxide.

5. The member as specified in any of claims 1, 2 or 3, wherein the weight ratio of aluminum oxide to silicon oxide in said member is from 68:32 to 57:43.

6. The member as specified in any of claims 1, 2 or 3, wherein said dried member is heated at a temperature of from about 1200° C. to about 1400° C. for a predetermined time to evolve all residual hydrogen and carbon and residual water and to substantially eliminate porosity to form said monolithic member.

7. A high-temperature-resistant transparent silica-alumina binary coating carried on a refractory substrate, said coating consisting of aluminum and silicon in an atom ratio of about 2:1 and in reacted oxide form, said coating having been formed by reacting precursor alkoxides of aluminum and silicon in the presence of water to form a clear solution, applying the reacted precursor alkoxides as a thin layer to the substrate to be coated and gelling the dried material at a predetermined temperature and time sufficient to evolve all residual hydrogen and carbon and residual water and to substantially eliminate porosity to form said coating on said substrate.

* * * * *